United States Patent
Patrick et al.

(10) Patent No.: US 10,112,513 B2
(45) Date of Patent: Oct. 30, 2018

(54) INFLATABLE SUPPORT BLADDER ASSEMBLY

(71) Applicant: Lear Corporation, Southfield, MI (US)

(72) Inventors: Gerald Patrick, Shelby Township, MI (US); Michael R. Powell, Waterford, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 15/381,272

(22) Filed: Dec. 16, 2016

(65) Prior Publication Data

US 2018/0170222 A1    Jun. 21, 2018

(51) Int. Cl.
*B60N 2/56* (2006.01)
*B60N 2/90* (2018.01)

(52) U.S. Cl.
CPC ........... *B60N 2/5657* (2013.01); *B60N 2/914* (2018.02)

(58) Field of Classification Search
CPC .............................. B60N 2/5657; B60N 2/914
USPC .............. 297/180.13, 180.1, 452.23, 180.14, 297/452.34; 5/655.3
See application file for complete search history.

(56) References Cited

U.S. PATENT DOCUMENTS

| | | | | |
|---|---|---|---|---|
| 2,343,996 A | * | 3/1944 | Perry | B60N 2/7088 267/117 |
| 3,112,956 A | * | 12/1963 | Schick | A47C 7/021 297/219.1 |
| 3,602,928 A | * | 9/1971 | Helzer | A47G 9/10 5/490 |
| 4,965,899 A | | 10/1990 | Sekido et al. | |
| 5,356,205 A | * | 10/1994 | Calvert | B62J 1/002 280/288.4 |
| 6,088,642 A | | 7/2000 | Finkelstein et al. | |
| 6,912,748 B2 | * | 7/2005 | VanSickle | A47C 4/54 5/653 |
| 7,559,610 B1 | * | 7/2009 | Hong Min | A47C 7/744 297/180.1 |
| 7,607,739 B2 | | 10/2009 | Browne et al. | |
| 8,671,482 B2 | | 3/2014 | Willingham | |
| 8,979,207 B2 | | 3/2015 | Bachar | |
| 9,144,314 B2 | | 9/2015 | Li | |
| 2015/0352979 A1 | | 12/2015 | O'Bannon et al. | |

\* cited by examiner

*Primary Examiner* — Milton Nelson, Jr.
(74) *Attorney, Agent, or Firm* — Brooks Kushman P.C.

(57) ABSTRACT

A vehicle seat with an inflatable bladder having a rear surface and a support surface opposite the rear surface is provided. The subassembly includes a seat climate control system having an air duct. An air duct tunnel is formed in the inflatable bladder and extends from the rear surface to the support surface. The air duct tunnel cooperates with the air duct to supply climate control air to a seating surface.

19 Claims, 3 Drawing Sheets

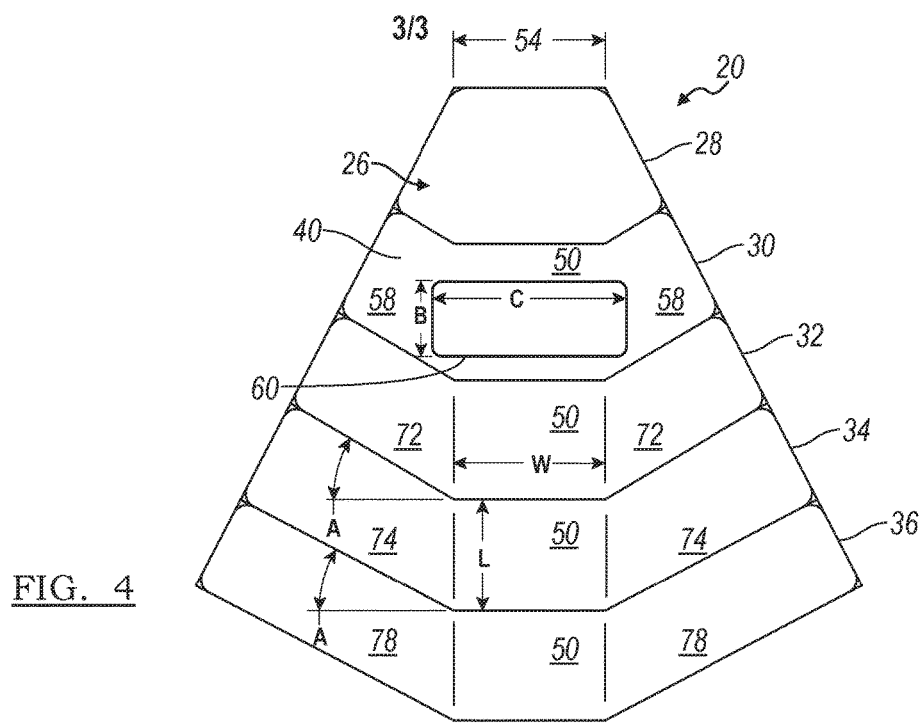
FIG. 4
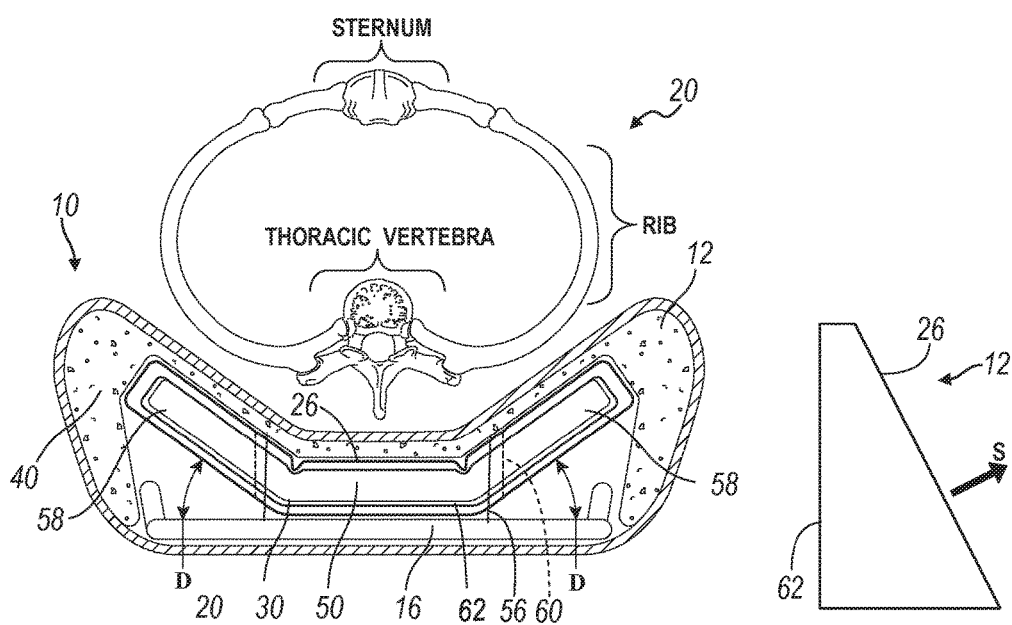
FIG. 5
FIG. 6

INFLATABLE SUPPORT BLADDER ASSEMBLY

TECHNICAL FIELD

Various embodiments are directed to an air bladder assembly for a thoracic region of a seat back.

BACKGROUND

In a seated position, a thoracic region of a person's spine supports much of the person's upper body mass.

SUMMARY

According to at least one embodiment, a vehicle seat assembly is provided with a seat frame. An inflatable support system having at least one inflatable bladder is mounted adjacent the seat frame at a rear surface of the at least one bladder. A cushion is positioned adjacent a support surface of the inflatable bladder that is spaced apart and opposite the rear surface. The seat assembly includes a seat climate control system having an air duct. An air duct tunnel is formed through the at least one inflatable bladder and extends from the rear surface to the support surface. The tunnel cooperates with the air duct to supply air to a cushion surface.

According to another embodiment, the seat frame is further defined as a seat back frame, and the at least one inflatable bladder is oriented within a thoracic region of the seat back frame.

According to another embodiment, the seat back is provided with a seating surface and the at least one inflatable bladder defines the support surface that is reclined relative to the contact surface to provide support, and wedge-shaped so that during inflation the support system inflates in an upward and forward direction relative to the seating surface.

According to another embodiment, the seat assembly includes an air duct bracket mounted to the seat frame and having an air passage opening. The air duct extends from the air duct bracket through the tunnel.

According to another embodiment, the cushion conducts air from the seat climate control system to a seating surface.

According to another embodiment, the air duct has a length greater than a tunnel length so that the air duct extends beyond the support surface of the at least one inflatable bladder.

According to another embodiment, the seat assembly includes a distribution layer disposed between the cushion and the inflatable support system. The distribution layer is in fluid communication with the air duct and a seating surface.

According to another embodiment, the seat assembly includes at least three inflatable bladders, wherein first and second bladders without tunnels are positioned on opposite sides of the one inflatable bladder having the tunnel.

According to at least one embodiment, a vehicle seat subassembly with an inflatable bladder having a rear surface and a support surface opposite the rear surface is provided. The subassembly includes a seat climate control system having an air duct. An air duct tunnel is formed in the inflatable bladder and extends from the rear surface to the support surface. The air duct tunnel cooperates with the air duct to supply climate control air to a seating surface.

According to another embodiment, at least three inflatable bladders, wherein first and second bladders without tunnels are positioned on opposite sides of the inflatable bladder having the tunnel.

According to at least one embodiment, an air bladder assembly for a seat is provided with at least one air bladder having a support surface and a rear surface. A tunnel is defined in the air bladder and sized to receive an air duct. The tunnel extends from the rear surface to the support surface.

According to another embodiment, the tunnel is generally rectangular shaped.

According to another embodiment, a width dimension of the rectangular shaped tunnel is greater than a length dimension of the bladder.

According to another embodiment, the at least one air bladder comprises a central region and a pair of lateral regions extending from opposed sides of the central region. The pair of lateral regions are oriented at a non-zero angle to incline laterally. A lateral width of the tunnel is greater than a central region width.

According to another embodiment, the non-zero angle is further defined as an angle in a range of fifteen to forty-five degrees.

According to another embodiment, the pair of lateral air bladder regions is also oriented at a second non-zero angle relative to the support surface of the central region to incline forward.

BRIEF DESCRIPTION OF THE DRAWINGS

FIG. 4 is a front elevation view of an inflatable bladder support system of the seat assembly of FIG. 1;

FIG. 5 is a top section view of the seat assembly of FIG. 1 showing one air bladder in the inflatable bladder support system; and FIG. 6 is an alternative side schematic view of the seat assembly of FIG. 1.

DETAILED DESCRIPTION

Figure 1:
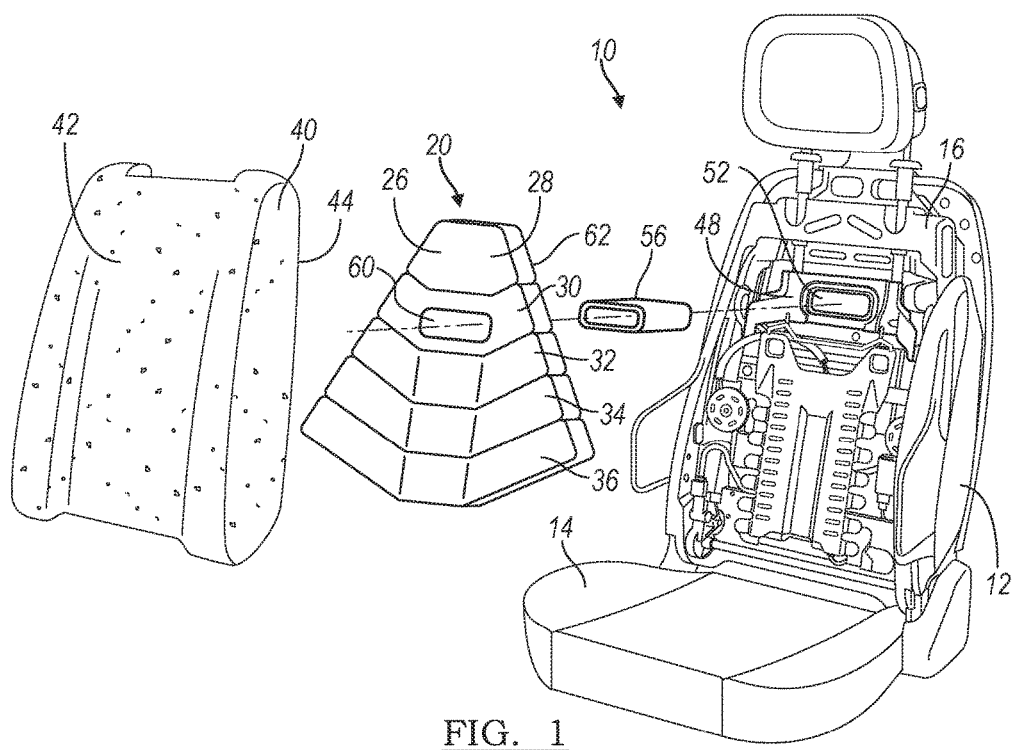
FIG. 1 is an exploded view of a seat assembly having an inflatable bladder support system according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about" in describing the broader scope of this invention. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

It is believed that supporting the thoracic region of the spine can reduce forces and support as much as one-third of the upper body mass. By increasing support of the upper body mass, loads are reduced on the muscles, vertebrae, and discs through the spine and pelvic regions. Decreased load reduces fatigue on these areas of the body. The current prevalent comfort back supporting technology for the furniture and transportation market focuses on the lumbar (lower) region of the back to provide relief from fatigue. With the change from a primarily labor intensive work force to one of computer-using desk workers, we see an increase in low back pain. This is driving the need for an improvement in the location of the seating support system designed to prevent fatigue and the resultant discomfort. By transferring support from solely located in the lumbar region to now include the thoracic region of the spine, load is transferred to a more rigid section of the spinal column as well and a decrease in lower back pain should result.

A comfort seating system for office or home seating furniture or comfort vehicular seating systems, such as in automotive, train, off-road vehicular or aircraft seating, provides supporting pressure along the thoracic region of the user's spine between the T1 to the T12 vertebrae, and lesser support in the lumbar region. The region above the T1 vertebrae is the cervical region; and the regions below the T12 vertebrae are the lumbar, sacral and coccyx regions.

The support structure is to be positioned along the thoracic region of a seat back when the user is seated. The support structure can be used in a variety of seating systems. Some exemplary seating systems and components are shown and described below.

There are four main factors that affect subjective comfort: 1) smoothness of the pressure integral; 2) sufficiency of the pressure change; 3) ability to create even pressure for a wide range of anthropometry; and 4) ergonomic/control suitability of actuation.

A thoracic region comfort seating system design is focused on addressing subjective comfort factors. By supporting the thoracic region, the user's load is transferred from the lumbar region to the thoracic region, reducing stress and fatigue in the muscles, tendons, and vertebrae.

A design feature permits even pressure for a wide range of anthropometry, which can be accommodated by having the degree of pressure adjustable.

Referring now to FIG. 1, a seat assembly is illustrated and referenced generally by numeral 10. The seat assembly 10 may be a vehicle seat such as for an automobile or an aircraft or any seat assembly that can benefit by an adjustable posture system. The seat assembly 10 has a seat back 12 pivotally mounted to a seat bottom 14. The seat assembly 10 includes a seat frame 16. The seat frame 16 may be formed of stamped metal components and may include a wire mat suspension.

The seat assembly 10 is also illustrated with an air routing system 18 and an inflatable support system 20 mounted on the frame 16. The inflatable support system 20 has an array of bladders that can be each adjustable and individually or collectively inflated providing support at various locations in the seat intended to accommodate different sized and statured individual occupants, as a thoracic support system. As shown in FIG. 1, the inflatable support system 20 is positioned in the seat back 12, however the inflatable support system 20 may also be positioned in a seat bottom 14.

Figure 2:
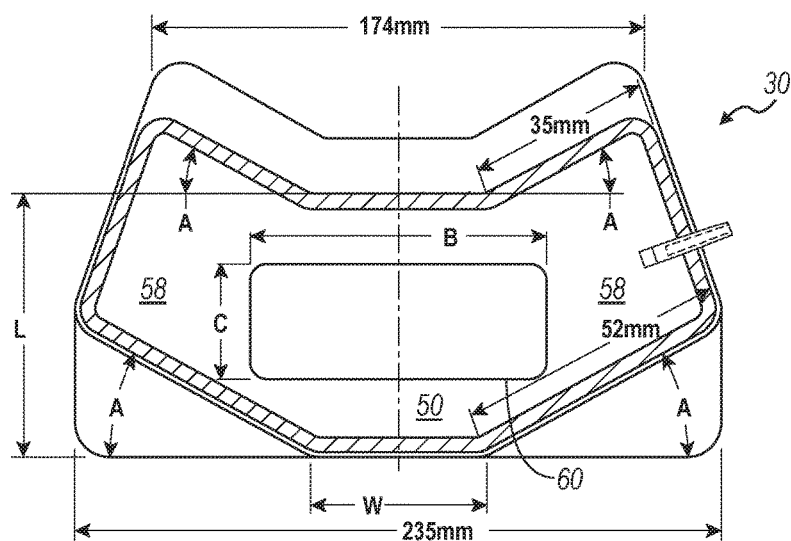
FIG. 2 is a detailed front view of one air bladder in the inflatable bladder support system of FIG. 1.
Figure 3:
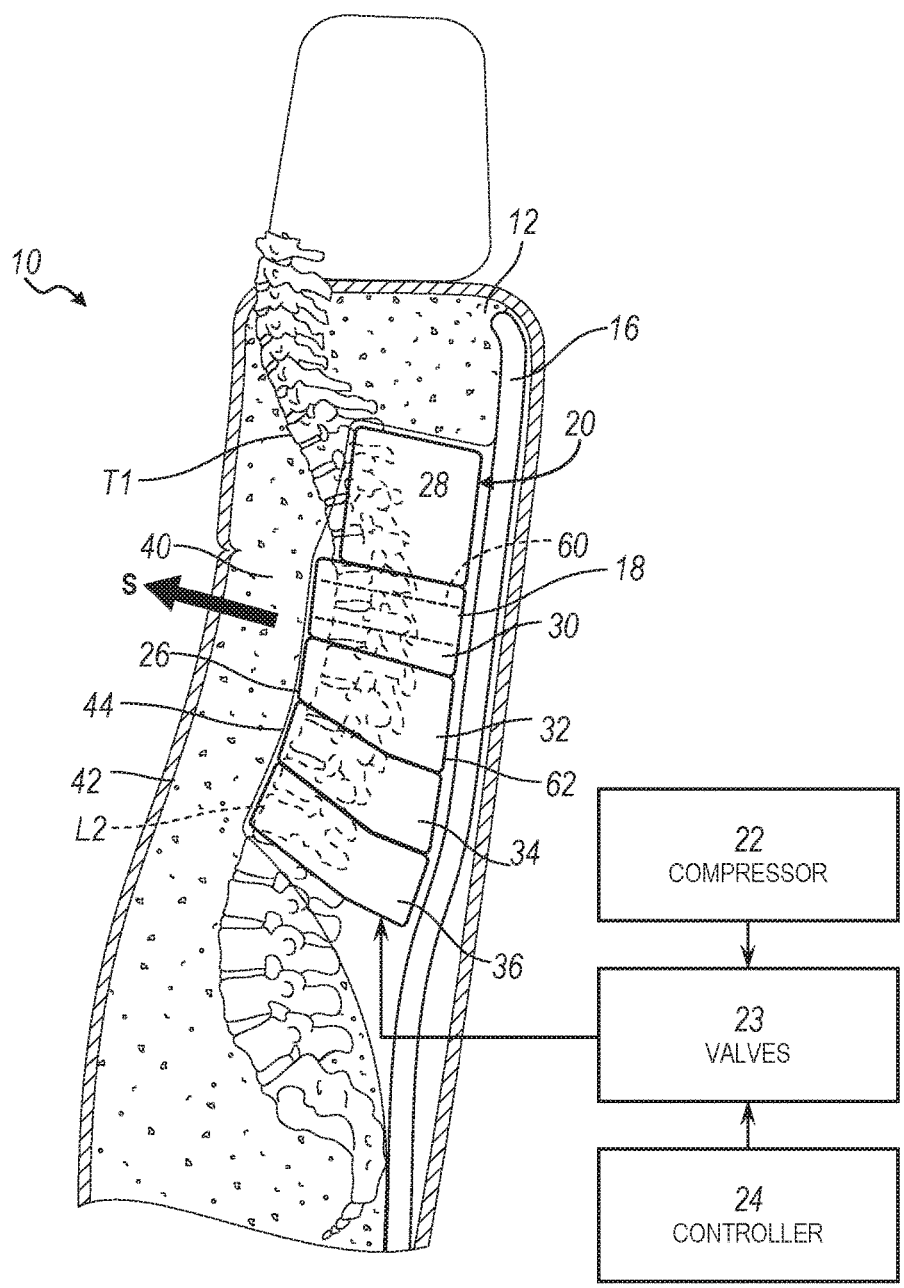
FIG. 3 is a side cross section view of the seat assembly of FIG. 1.

According to one embodiment, the inflatable thoracic support system 20 is a power pneumatic system in the seat back 12 which provides support to thoracic vertebrae a posterior rib cage (FIGS. 2 and 3) and between the shoulder blades, as illustrated in FIGS. 3 and 4 and to support an occupant to achieve a proper neutral seating posture. The support system 20 may be shaped in a wedge configuration as depicted in FIG. 5, to provide support in a forward and upwards direction (arrow S in FIGS. 1 and 5) to the thoracic region from thoracic vertebra T1 to thoracic vertebra T12 (FIGS. 1, 2, and 5) while the occupant is seated in a standard seating or driving position. The inflatable support system 20 is provided with a plurality of support bladders 28, 30, 32, 34, 36 illustrated in FIG. 1. The support bladders 28, 30, 32, 34, 36 are individually adjustable to achieve an optimum support condition for a variety of postures and occupant sizes. While five support bladders are illustrated, any number or configuration of support bladders may be utilized.

The inflatable support system 20 includes a compressor 22 for providing a source of pressurized air to valves 23. The valves 23 are controlled by a controller 24. The valves 20 are in fluid communication with each of the bladders 28, 30, 32, 34, 36 for controlling pressure and inflation. The controller 24 may operate as described in U.S. patent application Ser. No. 14/560,436 filed on Dec. 4, 2014, and published as US 2015/0352979, which is incorporated in its entirety by reference herein. The controller 24 permits individual adjustment of pressure of each of the bladders 28, 30, 32, 34, 36 as specified by an occupant selection or a predetermined pressure setting. The inflatable support system 20 is mounted to the wire mat suspension on the frame 16 of the seat back 12.

A seat cushion 40 that defines a seating surface 42 is provided over the inflatable support system 20. The seat cushion 40 may define the seating surface supporting the occupant on a seat back 12 or a seat bottom 14. A rear surface 44 of the cushion 40, opposite the seating surface 42, is mounted adjacent the inflatable support system 20. The seating surface 42 of the seat cushion 40 is covered with seat trim, such as fabric or leather.

The air routing system 18 is also provided in the seat assembly 10. The air routing system 18 may be provided in the seat back 12 or the seat bottom 14. The air routing system 18 provides ventilation and climate control for the seat assembly 10. The air routing system 18 includes a bracket 48 with a duct opening 52 mounted on the seat frame 16. Air for providing ventilation and climate control is provided at the duct opening 52 via air passages, not shown, in the seat back 12 or seat bottom 14. The air routing system 18 may include a controller, fan, valves and other components for controlling the supply of heated and cooled air.

An air passage duct 56 is connected to the duct opening 52 to distribute air to the rear surface 44 of the cushion 40. The cushion 40 may be air permeable to allow air to be distributed to the seating surface 42. The rear surface 44 may also include a layer for distributing and conducting the air to the seating surface 42. In one embodiment, the layer may have a plurality of air passages extending from the layer to the seating surface 42.

At least one air bladder in the inflatable bladder support system 20 includes an air duct tunnel 60 that extends through the air bladder. The air duct tunnel 60 is sized to receive the air passage duct 56. The air duct tunnel 60 is shown in more detail in FIG. 2.

The inflatable support system 20 may be oriented in a thoracic region of an occupant's back. In other words, the inflatable support system 20 is sized to have a plurality of air bladders 28, 30, 32, 34 located between the shoulder blades and between the T1 and T12 vertebrae for an average occupant. The inflatable support system 20 may also include a lower bladder 36 that oriented in the lumbar region of the occupant's back, such as the L2 and L3 vertebrae.

The seat back 12 has a seating surface 42 as depicted in FIG. 1. FIG. 3 illustrates a simplified schematic section view of the seat back 12. The inflatable support system 20 is provided with a plurality of support surfaces 26 (FIG. 3) within the seat back 12. The support surfaces 26 of the inflatable support system 20 are reclined relative to the seating surface 42 of the seat back 12 so that inflation of the support bladders 28, 30, 32, 34, 36 provides support in the upward and forward direction S, as shown in FIGS. 2 and 6. The support bladders 28, 30, 32, 34, 36 are supported by the seat frame 16 along a rear surface 62.

The inflatable support system 20 is also illustrated removed from the seat back 12 in FIG. 4. The inflatable support system 20 includes an upright column of central air bladder regions 50, each within one of the support bladders 28, 30, 32, 34, 36 for supporting the thoracic and lumbar vertebrae as depicted in FIG. 3. The upright column of central air bladder regions 50 are arranged longitudinally within the seat back 12, or generally up and down along the seat back 12 in this environment shown in FIG. 4. Each of the central air bladder regions 50 has a length L of approximately one hundred millimeters, by example. Further, each of the central air bladder regions 50 has a width W of approximately sixty millimeters, by example As shown in FIG. 4, the first air bladder 28 has an upper width 54 that is the same as the width W of the central bladder regions 50, by example of sixty millimeters. The first air bladder 28 is tapered outward fit between an occupant's shoulder blades. The first air bladder 28 is provided by a single air bladder region being polygon-shaped. The air bladders 30, 32, 34, 36 are provide below the first bladder 28 and each of the air bladders 30, 32, 34, 36 have a complex shape defined by multiple regions to provide support to the vertebrae and ribs of the occupant.

For example, as shown in more detail in FIG. 2, the second air bladder 30 has a pair of lateral air bladder regions 58 extending from opposed sides of the central air bladder region 50 for supporting the ribs in the thoracic region of an occupant. The each of the lateral air bladder regions 58 is angled relative to the central air bladder region 50 to incline laterally so that each air bladder 30, 32, and 34 fits adequately within the thoracic region. According to one embodiment, the offset angle A of the pair of lateral bladder regions 58 is within a range of fifteen to forty-five degrees. In another embodiment, the lateral bladder regions 58 extend at an offset angle A of approximately thirty degrees, for example. Each of the pair of lateral air bladder regions 58 has an upper width of approximately thirty-five millimeters for example, and a lower width of fifty-two millimeters thereby defining the lateral bladder regions as irregular quadrilateral shapes, such as trapezoids.

The second air bladder 30 includes tunnel 60 that defines an opening that extends from a rear surface 62 to the support surface 26. The tunnel 60 is sized to receive the air duct 56 and the tunnel 60, like the air duct 56, is generally rectangular. However, the tunnel 60 may be any suitable shape to correspond to a shape of an air duct. In one embodiment, the tunnel has a lateral width dimension B being in a range of approximately 110 mm to 115 mm and a length C being in the range of forty millimeters to fifty millimeters. As shown in FIG. 2, the tunnel 60 is centered at the center of the central bladder region 50. The width dimension B of the tunnel 60 is greater than the width W of the central bladder region 50 so that the tunnel also extends to the lateral bladder regions 58. The width dimension B of the tunnel 60 is greater than the length L of the central bladder region 50.

The tunnel 60 has a thickness length that is generally equal to the thickness of the air bladder 30. As such, the tunnel 60 does not inhibit inflation of air bladder 30 in the region of the tunnel. The support surface 26 of the bladder 30 is generally coplanar with the support surfaces of the bladders 28, 34 positioned on opposite sides of the bladder 30 having a tunnel 60.

Referring again to FIG. 4, a third air bladder 32 is provided longitudinally below the second air bladder 30. The third air bladder 32 also has a pair of lateral air bladder regions 72 extending from opposed sides of the third air bladder 32 at an angle A, similar to the first pair of lateral air bladder regions 58. The lateral air bladder regions 72 extend a width expanding to approximately fifty-two millimeters along the upper surface.

With continued reference to FIG. 4, a fourth air bladder 34 is provided longitudinally below the third air bladder 32 and has lateral air bladder regions 74. Similarly, a fifth air bladder 36 is provided longitudinally below the fourth air bladder 34 with lateral air bladder regions 78. The lateral air bladder regions 74, 78 are also offset at an angle A from the central bladder regions 50 and have increasing widths to provide comfort and support to the occupant. For example, the lateral air bladder regions 74 extend a width of approximately sixty-nine millimeters from the central bladder regions 50 along the upper surface, while the lateral air bladder regions 78 extend distance greater than sixty-nine millimeters.

FIG. 5 illustrates that the second pair of lateral air bladder regions 58 of the second air bladder 30 are oriented and pivoted at a fore-aft angle D relative to central bladder region 50 to provide a concave the support surface 26 for supporting the ribs in the thoracic region. The air bladders 32, 34, 36 are similarly angled for concavity under deflected conditions. The angle of the offset of the second pair of lateral air bladder regions 58 to the third central bladder region 50 may be within a range of fifteen to forty-five degrees. When an occupant sits in the seat assembly 10, his/her weight presses rearward into the seat back 12 causing the foam and suspension system to deflect rearward to a degree representative of the force applied by the occupant's position and size. When this occurs, the side bladders 36, 38, 42, 44 described then position in a concave shape, wrapping the occupant in the support pneumatic system 20. The air duct 56 may have a length sufficient extend from the rearward surface 62 to the support surface 26 even if the lateral regions are deflected, as shown in FIG. 5.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
   a seat frame;
   an inflatable support system having at least one inflatable bladder controlled to inflate between first and second inflated positions, the inflatable support system mounted adjacent the seat frame at a rear surface of the at least one bladder;
   a cushion positioned adjacent a support surface of the inflatable bladder that is spaced apart and opposite the rear surface;

a seat climate control system having an air duct; and an air duct tunnel formed through the at least one inflatable bladder and extending from the rear surface to the support surface, the tunnel cooperating with the air duct to supply air to a cushion surface, wherein the cushion covers an opening of the air duct tunnel.

2. The seat assembly of claim 1 wherein the seat frame is further defined as a seat back frame, and the at least one inflatable bladder is oriented within a thoracic region of the seat back frame.

3. The seat assembly of claim 2 wherein the seat back is provided with a seating surface; and wherein the at least one inflatable bladder defines the support surface that is reclined relative to the seating surface to provide support, and wedge-shaped so that during inflation the support system inflates in an upward and forward direction relative to the seating surface.

4. The seat assembly of claim 1 further comprising an air duct bracket mounted to the seat frame and having an air passage opening, wherein the air duct extends from the air duct bracket through the tunnel.

5. The seat assembly of claim 1 wherein the cushion conducts air from the seat climate control system to a seating surface.

6. The seat assembly of claim 1 wherein the air duct has a length greater than a length of the tunnel so that the air duct extends beyond the support surface of the at least one inflatable bladder.

7. The seat assembly of claim 1 further comprising a distribution layer disposed between the cushion and the inflatable support system, the distribution layer in fluid communication with the air duct and a seating surface.

8. The seat assembly of claim 1 further comprising at least three inflatable bladders, wherein first and second bladders without tunnels are positioned on opposite sides of the one inflatable bladder having the tunnel.

9. A vehicle seat subassembly comprising:
an inflatable bladder having a rear surface and a support surface opposite the rear surface;
a seat climate control system having an air duct;
an air duct tunnel formed in the inflatable bladder and extending from the rear surface to the support surface; and
a cushion layer positioned along the support surface of the inflatable bladder and covering and opening of the air duct tunnel, wherein the air duct tunnel cooperates with the air duct to supply climate control air to a seating surface.

10. The vehicle seat subassembly of claim 9 further comprising a cushion, wherein a rear cushion surface is positioned adjacent the support surface of the inflatable bladder, wherein the air duct is in fluid communication with the cushion.

11. The vehicle seat subassembly of claim 9 wherein the tunnel has a generally rectangular shaped opening.

12. The vehicle seat subassembly of claim 9 further comprising at least three inflatable bladders, wherein first and second bladders without tunnels are positioned on opposite sides of the inflatable bladder having the tunnel.

13. An air bladder assembly for a seat comprising:
at least one air bladder having a support surface and a rear surface, the inflatable bladder controlled to be inflated between at least a first and second position to provide varying support along the support surface; and
a tunnel defined in the air bladder and sized to receive an air duct, the tunnel extending from the rear surface to the support surface, wherein the at least one air bladder comprises a central region and a pair of lateral regions extending from opposed sides of the central region wherein the pair of lateral regions are oriented at a non-zero angle to incline laterally,
wherein a lateral width of the tunnel is greater than a central region width.

14. The air bladder assembly of claim 13 wherein the tunnel is generally rectangular shaped.

15. The air bladder assembly of claim 14 wherein a width dimension of the rectangular shaped tunnel is greater than a length dimension of the bladder.

16. The air bladder assembly of claim 13 further comprising at least three air bladders, wherein first and second bladders without tunnels are positioned on opposite sides of the one air bladder having the tunnel.

17. A seat assembly comprising a seat back and an air bladder according to claim 13 oriented within a thoracic region of the seat back.

18. The air bladder assembly of claim 13 wherein the non-zero angle is further defined as an angle in a range of fifteen to forty-five degrees.

19. The air bladder assembly of claim 13 wherein the pair of lateral air bladder regions is also oriented at a second non-zero angle relative to the support surface of the central region to incline forward.

* * * * *